Figure 1:
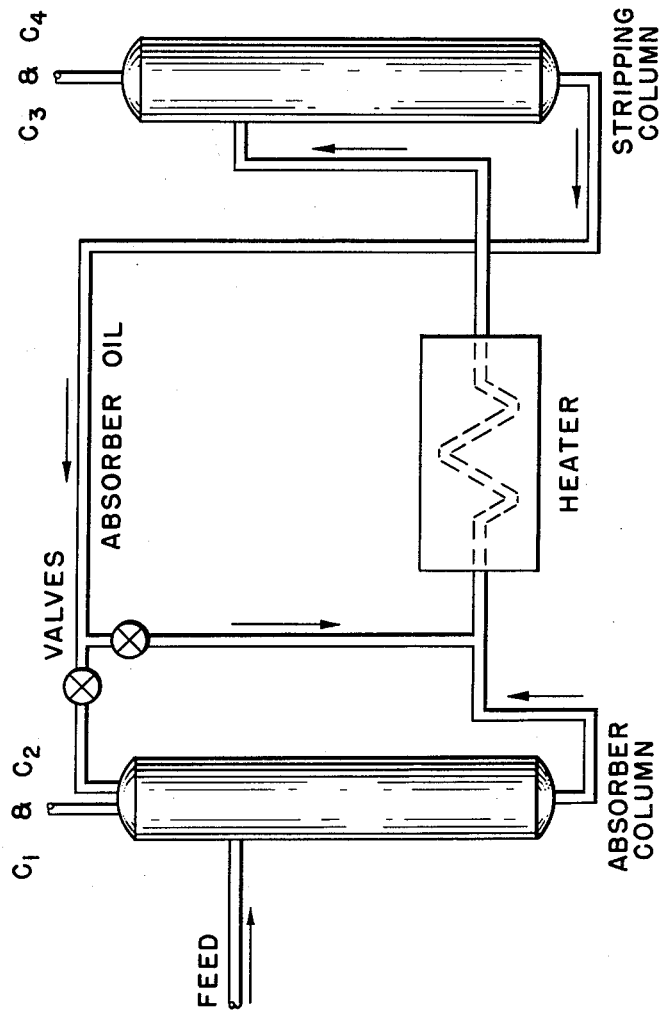

INVENTOR.
EUGENE C. MANNAS
BY
Floyd Trimble
ATTORNEY

United States Patent Office 2,726,191
Patented Dec. 6, 1955

2,726,191

PROCESSING RAW NATURAL GAS TO RECOVER GASEOUS AND GASOLINE HYDROCARBONS

Eugene C. Mannas, Oklahoma City, Okla., assignor to Continental Oil Company, Ponca City, Okla., a corporation of Delaware Application March 24, 1955, Serial No. 496,429

5 Claims. (Cl. 196—8)

This invention is concerned with an improved process for separating and recovering the higher hydrocarbon constituents from raw natural gas and is a continuation-in-part of my copending application Serial No. 212,993, filed February 27, 1951, now abandoned.

The process of the present invention is based upon the absorption of hydrocarbons having more than 2 carbon atoms per molecule from natural gas in a suitable absorber oil followed by stripping the thus absorbed hydrocarbon from the absorber oil and the fractional separation of the hydrocarbon mixtures thus obtained.

The broad process utilizing the steps of absorption, stripping, and fractionation is old. Prior art processes embodying these steps have had shortcomings resulting from limited flexibility of operation and considerable waste of process heat.

I have now improved this broad process so that it may be operated efficiently over a wide range, even as low as about 25 per cent, of any designed capacity of gas throughout. My improvement further embraces complete process control under conditions under which the higher molecular weight hydrocarbon content of the raw gas as well as the species of higher molecular weight hydrocarbon present, may be variable over a wide range due to variations in source conditions.

Thus, my improved process is equally applicable to a wide variety of physical and economic conditions for the production of a "dry" or residue gas for fuel and for formation repressuring purposes, and the recovery of valuable constituents such as ethane, propane, butane, gasoline fractions, etc.

Examples of widely varying conditions to which my improved process is equally applicable with a flexibility of control not available heretofore, are as follows:

1. A single producing field wherein the gas composition is relatively constant can be processed to fully meet the changing requirements of:

(a) Variability in market demands for such products as residue fuel gas, pure or mixed hydrocarbon components—propane, butane or higher, gasoline, etc., and in some instances even ethane as well;

(b) Repressuring or recycling the reservoir formation at, for example, pressures of 1000 p. s. i. g. or more which can be maintained in the process of this invention so as to simplify and make more economical the repressuring operations; and (c) Governmental allowables which may drastically alter the amounts of gas available for processing, hence requiring a complete control and flexibility of plant operation to meet such changes.

2. The process of the present invention is especially applicable where the composition of the raw gas is variable as obtained through gas collection systems fed by a variety of different fields. Here the benefits of the control and flexibility of my improved process can be realized to the fullest extent.

It is a principal object of my invention to provide an improved process having the advantages enumerated above.

Other objects and advantages of my invention will appear as the description proceeds.

To the accomplishment of the foregoing and related ends, my invention, then, comprises the features hereinafter fully described and particularly pointed out in the claims, the following description and the accompanying drawings setting forth in detail certain illustrated embodiments of the invention, these being indicative, however, of but a few of the various ways in which the principle of the invention may be employed.

In the drawings:

Fig. 1 is a schematic diagram of the process.

Figure 2:
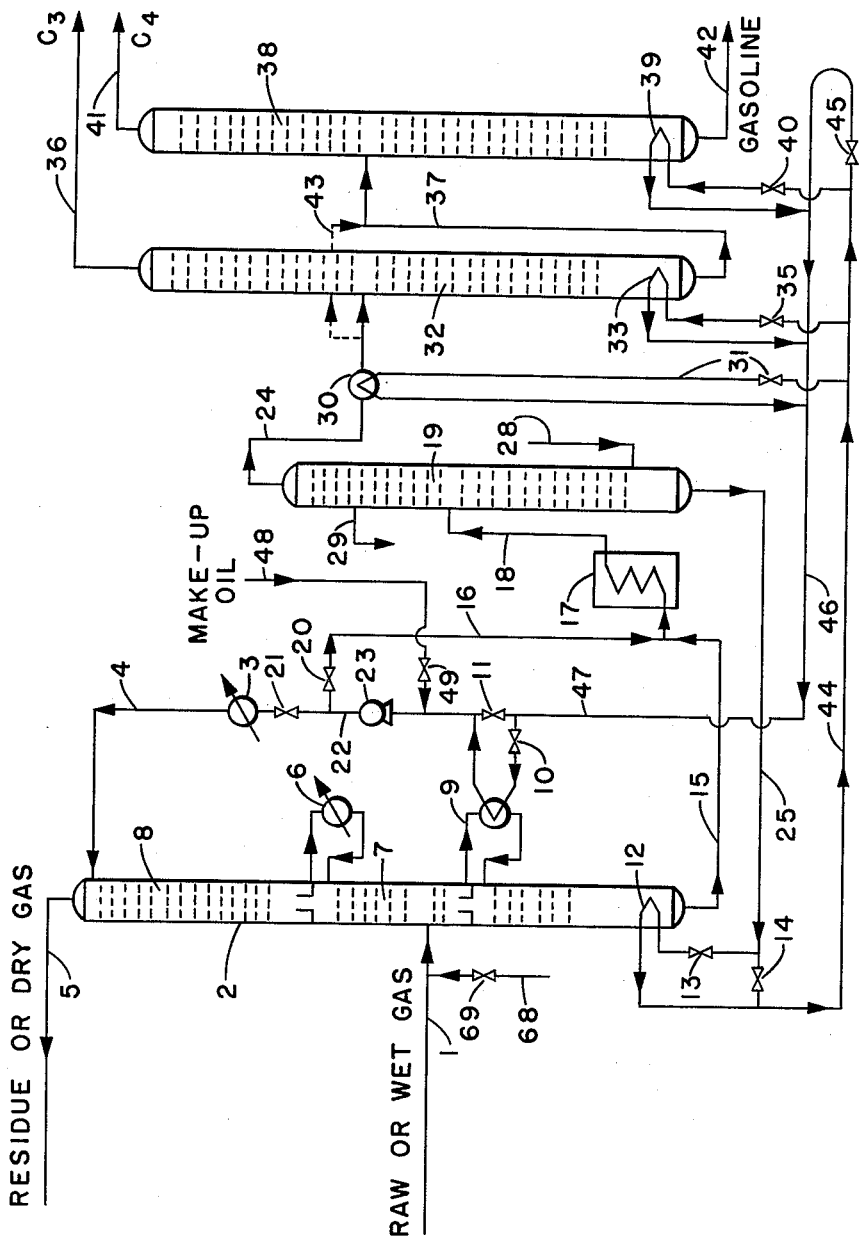
Figure 3:
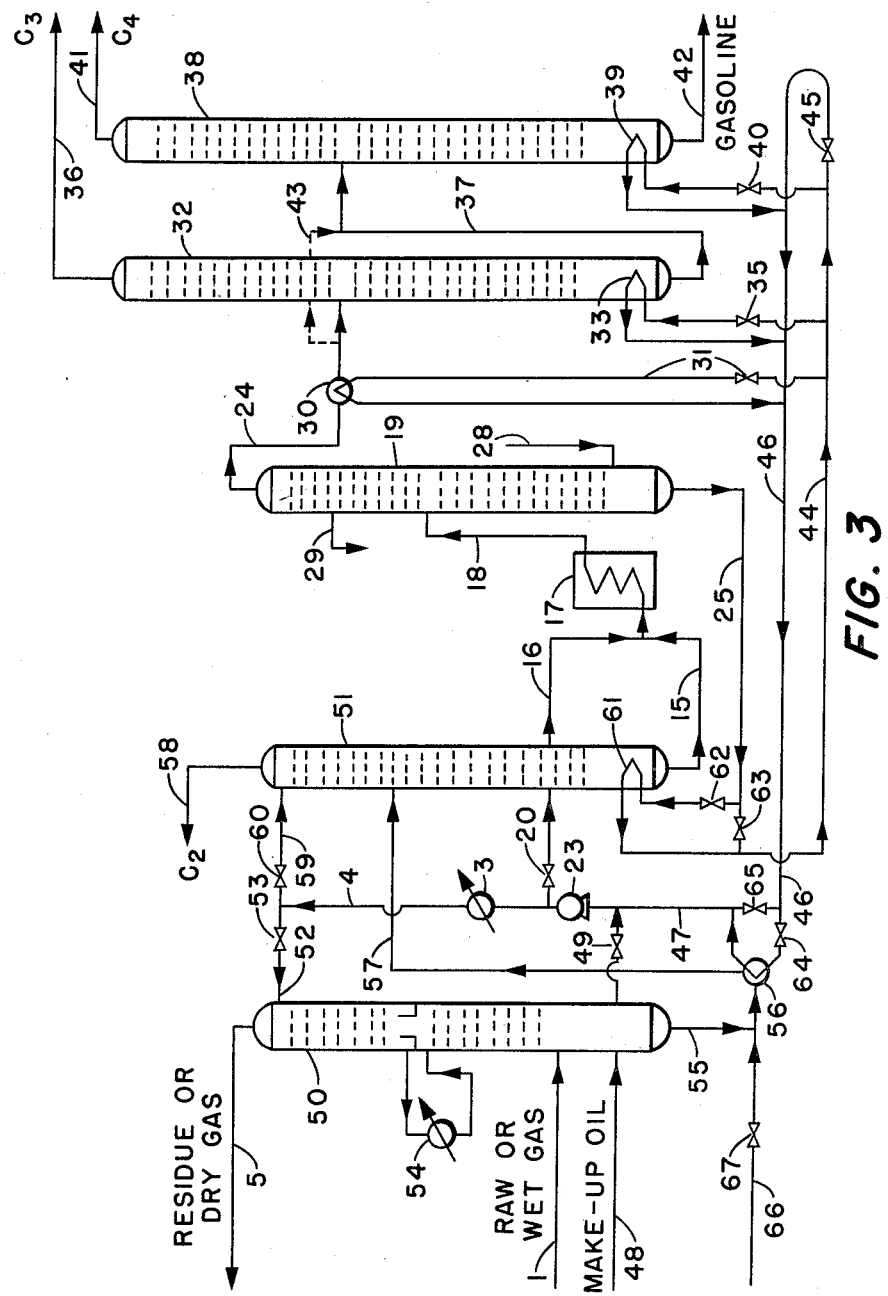

Fig. 2 is illustrative of apparatus useful in carrying out the process wherein the pressure of the raw gas feed does not ordinarily exceed a pressure of about 500 p. s. i. g.; and Fig. 3 is illustrative of apparatus useful in carrying out the process which is applicable to a wider range of inlet gas pressures, i. e., it will operate under pressure conditions of process according to Fig. 2 as well as higher pressures of the order of 1000–2000 p. s. i. g. or more.

Broadly stated, my invention relates to the process of fractionating natural gas which contains a mixture of different molecular weight hydrocarbons and wherein the raw natural gas to be fractionated is scrubbed with an absorber oil which will absorb from the raw gas stream the major proportion of the heavier hydrocarbons, the absorber oil is then stripped of its absorbed components and the thus produced lean oil then recycled in the process, and comprises the improvements of thus recycling in the system a total quantity of absorber oil substantially in excess of that used to scrub the natural gas and blending the stream of such excess of lean oil with the stream of oil which has been enriched by the scrubbing operation before such enriched oil is stripped of its absorbed components.

Step-wise the process as illustrated by Fig. 1 may be written in tabular form as follows: A process for fractionating a natural gas mixture which comprises 1. Scrubbing the gas mixture with an absorber oil.
2. Blending the enriched absorber oil with an additional quantity of lean absorber oil.
3. Heating the blended oil.
4. Stripping the blended oil of the absorbed components.

Referring now specifically to Fig. 2, the general operation of the process will be described:

Raw or "wet" natural gas, preferably freed from sulfurous compounds as by a previous sweetening operation when necessary, is fed through charge line 1 at a pressure not exceeding about 500 p. s. i. g. into an absorber deethanizer column 2 where it is counter-currently scrubbed with a lean absorption oil, such as a narrow-cut kerosene fraction, introduced into column 2 flowing from cooler 3 through line 4. The amount of lean oil thus introduced will be balanced to the amount and composition of incoming gas in such a way as to secure maximum saturation thereof with hydrocarbons of more than two carbon atoms and to obtain minimum solubility of hydrocarbons of one and two carbon atoms, at a minimum column operating temperature. The residue or "dry" gas consisting of methane and ethane passes out through line 5 at a pressure either about equal to inlet 1 or less depending on the end use thereof.

The amount of lean oil blended may be stated in terms of the amount of oil passed through the absorber or in terms of the amount of the absorbed components in the rich oil. When the former method is used the amount of lean oil blended may be 4 times the amount of absorption oil passed through the absorber. When the amount of lean oil blended with the rich oil is stated in terms of the amount of absorbed constituents it may range from 1 to 8 times the amount of the absorbed constituents. As a specific example, while circulating 163,000 gallons of absorption oil the absorbed constituents amounted to 11,439 gallons of propane, 11,747 gallons of butanes and 8,490 gallons of 26–70 gasoline, or a total of 31,676 gallons of absorbed components. The amount of lean oil blended with the rich oil during this operation was 134,000 gallons. This amounted to about 4.2 gallons of lean oil per gallon of absorbed constituents. Variations in the amount of oil blended are dependent upon the plant gas throughput, heat transfer equipment and types of products to be manufactured. Taking these factors into consideration the total quantity of lean oil blended may be as high as 8 gallons of lean oil per gallon of absorbed constituents with a small throughput of gas through the plant and depending upon the utilization of the heat from the lean oil for fractionating the products. When the plant is operated at full capacity the lean oil by-passed or blended may be as low as one gallon per gallon of products absorbed, again dependent upon the utilization of the oil.

A particular advantage of my invention resides in the fact that it is not necessary to subject the rich oil stream to an additional absorption step when operated in accordance to the flow diagram of Fig. 2. In Fig. 2 the rich oil from the absorber is blended with lean oil, passed through the heat exchanger 17 to the stripper 19 where the absorbed components are removed as an overhead distillate. When the process is operated in accordance to the alternative method as illustrated by Fig. 3, all components except methane are absorbed in column 50. The rich oil from column 50 passes into the de-ethanizer column 51 where ethane and residual methane are stripped from the enriched oil under controlled conditions of pressure and temperature. It could be said that a certain limited amount of re-absorption occurs in this column. The enriched oil from column 51 is blended with lean oil similarly to the procedure disclosed in Fig. 1 passed through a heat exchanger and then to the stripping column where the ethane is removed. One difference in the two processes as illustrated in Figures 2 and 3 is that methane and ethane are both removed in one column in the former process. In the process illustrated by Fig. 3, however, one column is used for removing methane and a second column is used for removing ethane.

Intercooler 6 is provided to remove heat of absorption which occurs in section 8 of column 2 and lowers the temperature sufficiently so that substantially no absorbed hydrocarbons of more than two carbon atoms escape into the residue gas from absorption section 8.

Interheater 9, operating on process-heated lean absorber oil controlled by valves 10 and 11, functions to heat the fluids below entry line 1 of column 2, to insure substantially no retention of ethane in the absorber and provides for a better heat-load distribution in conjunction with reboiler 12 operating on process-heated lean absorber oil controlled by valves 13 and 14.

Ordinarily, reboiler 12 operates at a heat input, related to the prevailing pressure within column 2, sufficient to prevent any appreciable desorption of hydrocarbons having more than two carbon atoms; however in some instances such as providing for enrichment of the residue gas with propane, the reboiler 12 may be operated at an appropriately higher temperature. For example, in the following Table I will be found the column pressures and reboiler temperatures that may be employed depending upon the extent of absorption desired in column 2:

TABLE I

*Temperature-pressure conditions in absorber-de-ethanizer*

| Absorber Oil to Contain | Pressure, p. s. i. g. | Reboiler Temperature, ° F. |
| --- | --- | --- |
| $C_2+$ | 500+75 | 300+20 |
| $C_3+$ | 300+50 | 400+20 |
| $C_4+$ | 170+20 | 380+20 |

NOTE.—Combinations of pressures and temperature other than shown above may be used to control the extent to which a given hydrocarbon component is left in the residue gas.

The enriched oil passes from column 2 through line 15 to be combined with lean absorption oil from line 16 and the mixture then passed through tube furnace 17 where it is sufficiently heated to a temperature not exceeding about 500° F. before passing through line 18 to desorption or stripper column 19.

The introduction of lean oil as described in the preceding paragraph serves several purposes, important among which are the novel features of the invention:

1. To lower the mol concentration of absorbed hydrocarbons, thus preventing their premature gassing from the oil while being heated in furnace 17, causing destructive heating of furnace tubes and other difficulties.

2. To provide a sufficient volume of oil to maintain the several heating requirements of the process described in part above and more fully hereinafter.

3. To provide the means whereby a sufficient quantity of absorption oil can be maintained in the system in a completely controlled and working relationship to, and for the needs of, the process.

With regard to the third purpose just stated, the process splitting of the lean oil stream is maintained by means of control valves 20 and 21 which split the residual-heat containing lean oil stream, delivered by pump 23 from a process heating schedule, into two streams, the first of which passes through cooler 3 to the absorption step (supra) and the other through line 16 recombining with said first stream after its enrichment with hydrocarbons, before entry to furnace 17 to the accomplishment of the novel advantages outlined above.

The relative proportions of the two lean oil streams obtained by means of control valves 20 and 21 are dependent upon the quantity and/or composition of the raw gas feed as indicated by way of example in Table II for a given plant operating at 100% and 25% of its designed raw gas throughout:

TABLE II

*Lean oil proportioning*

| Plant Operating at Percent of Capacity | Proportion of Total Lean Oil | |
| --- | --- | --- |
| | To Absorber, $(1-x)$ parts | To Furnace, $(x)$ parts |
| 100% | 0.5 | 0.5 |
| 25% | 0.3 | 0.7 |

NOTE.—It is to be understood that these proportions may vary at any plant capacity in a manner additionally dependent upon the composition of the raw gas feed.

Continuing with Fig. 2, the heated enriched oil stream flows from furnace 17 through line 18 into the stripper column 19 where it is stripped of its absorbed raw gas components under suitable conditions of pressure and temperature. The gas components pass overhead through line 24 representing conventional condensation and column reflux equipment not shown; the hot stripped oil leaves stripper column 19 by way of line 25 to begin its schedule of process heating requirements.

Stripping of the oil in column 19 may be assisted by steam through line 28 at a rate, for example, of 0.2 lb.

steam per gallon of oil feed; steam condensate being removed such as at a water tray through line 29. Instead of steam, however, gases such as propane obtained from the process may be introduced through line 28 (line 29 closed) and the propane then recovered from the process in the same manner that the propane, stripped from the raw gas feed, is handled.

Examples of the operating conditions in stripper 19 are given in Table III:

TABLE III
*Operation of enriched oil stripper*

| Composition of Feed to Stripper | Temperature, °F. | | Minimum Pressure in Stripper, p. s. i. g. |
|---|---|---|---|
| | of Feed | Stripper Bottom | |
| Oil, $C_3+$ | 450 | 425 | 100 |
| Oil, $C_4+$ | 430 | 410 | 80 |

The hydrocarbon mixture flowing in line 24, ordinarily consisting of $C_3$ and heavier hydrocarbons, is fractionated by conventional means into its components such as propane, butane, and a gasoline fraction of varying butane content. For instance in Fig. 2 (and the same is true in Fig. 3), the hydrocarbons having more than two carbon atoms pass through heater 30, in heat exchange with hot lean oil supplied through the line and control valve circuit 31, to the depropanizing fractionator 32, the temperature distribution of which is controlled by reboiler 33 and its control 35 on the heated process lean oil. Propane passes overhead to storage through line 36 and the bottoms (hydrocarbons having more than three carbon atoms) pass through line 37 to a debutanizer-fractionator 38, which except for differences in pressure operates (similarly to depropanizer 32) by means of the hot oil reboiler 39 and control 40. Butane passes overhead through line 41 and a gasoline product bottoms is drawn off through line 42. Although not shown in the drawings, the propane and butane overhead lines 36 and 41 represent condensation and column reflux systems conventionally employed. Depropanizer by-pass 43 is provided in the event that propane is diverted to the residue gas from absorber column 2, or if no separation of propane and butane is desired.

Examples of operating conditions in the depropanizing fractionator (32) and the debutanizing fractionator (38) are given in Tables IV and V respectively:

TABLE IV
*Operation of de-propanizer*

| Pressure, p. s. i. g. | Feed Inlet Temp., °F. | Reboiler Temp., °F. |
|---|---|---|
| 190 | 130 | 160 |

TABLE V
*A. Operation of de-butanizer*

| Pressure, p. s. i. g. | Feed Inlet Temp., °F. |
|---|---|
| 70 | 155 |

*B. Control of gasoline vapor pressure*

| Gasoline, R. V. P. | Reboiler Temp., °F. |
|---|---|
| 12 | 226 |
| 14 | 222 |
| 16 | 218 |
| 20 | 210 |
| 24 | 200 |

From an inspection of Fig. 2, the function and flow scheme of the stripped hot obsorption oil will be clearly apparent, the main conduction lines of which are 25, 44, 46, and finally 47 leading to pump 23 to repeat its cycle. Control valves 11 and 14 control the back pressure to a degree sufficient for heaters 9 and 12, respectively. The action of valves 11 and 14 is further coordinated with back pressure valve 45 which provides sufficient pressure in line 44 for flowing the hot oil through reboilers 33 and 39 with individual control of the separate heating requirements in each reboiler by respective valves 35 and 40. Make-up lean oil is introduced through line 48.

Referring now to Fig. 3, there is here shown a modification of the process described in connection with Fig. 2. The like numbers in each figure refer to the like parts of each and such designated parts will not, for the most part, be described further in connection with Fig. 3, since the functions are substantially the same.

As previously indicated, the process according to Fig. 3 provides for operations which supply raw natural gas at any pressure, but particularly it also applies in those cases of high well-head pressures, above 500 p. s. i. g. and more of the order of 1000-2000 p. s. i. g. In instances of repressuring or recycling the subterranean reservoir with the residue gas, then it is desirable to operate the absorption step of the process so as to minimize a loss in the initial pressure of the raw gas. This is done by employing separate vessels, absorber 50 and de-ethanizer 51, instead of the single absorber-de-ethanizer of Fig. 2.

Raw natural gas enters through charge line 1 into absorber column 50 where it is countercurrently scrubbed with cooled lean absorption oil flowing from line 52 controlled by valve 53. The major portion of the methane is bled off from the top of absorber column 50. Substantial amounts of ethane, a minor amount of methane, and all of the propane and heavier components are absorbed in the oil. Intercooler 54 controls the heat of absorption of the downwardly flowing column liquid. The enriched absorption oil is drawn off through line 55 and is heated through the hot lean oil exchanger 56 controlled by valves 64 and 65 supplied by hot lean oil from line 46. The heated enriched oil passes, by way of line 57, into the de-ethanizer column 51 where ethane and residual methane are stripped from the enriched oil under controlled conditions of pressure and temperature and pass out through line 58. The upwardly passing gases are scrubbed with fresh lean oil from line 59 controlled by valve 60. The required temperature in de-ethanizer 51 is provided by the hot oil heater 61 controlled by valves 62 and 63 supplying hot stripped oil from line 25.

The enriched oil containing the propane and heavier gas components flows through line 15 to be combined with a lean oil feed from line 16 before heating in furnace 17. The remainder of the process is the same as described for Fig. 2.

The splitting of the lean oil stream through lines 4 and 20 is based upon the same conditions as described for Fig. 2. However, the stream in line 4 is additionally divided between columns 50 and 51 through valves 53 and 60, respectively. A representative proportioning of the three lean oil streams is shown in Table VI.

TABLE VI
*Proportioning of lean oil in Fig. 3*

| Plant Operating at Percent Capacity | Proportion of Lean Oil to— | | |
|---|---|---|---|
| | Absorber 50, $(1-x)$ parts | De-ethanizer 51, $(x-a)$ parts | Line 16, $(a)$ parts |
| 100 | 0.4 | 0.1 | 0.5 |
| 25 | 0.25 | 0.05 | 0.7 |

Note.—These proportions may vary at any plant throughput additionally dependent upon the compositions of raw feed and of the separate enriched oil streams; no fractional portion of lean oil will be zero.

The different forms of the process of this invention as shown by Fig. 2 and Fig. 3, respectively, may be operated to include an additional charge stream, as for example, through line 68 and valve 69 in Fig. 2 or line 66 and valve 67 of Fig. 3, to combine with the rich gas in Fig. 2 or to combine with the enriched oil from absorber 50 in line 55 of Fig. 3. Charge stream of wet gas in Fig. 2 and charge stream 66 in Fig. 3 then consist of hydrocarbon condensates obtained from the liquid separators employed at the gas well head or in the plant.

A commercial operation according to this invention for processing raw natural gas is shown in the following examples:

EXAMPLE I

Raw natural gas having the following analysis was processed for the separation of propane and higher components therefrom:

| Component: | Mol per cent |
|---|---|
| Nitrogen | 3.0 |
| Methane | 50.0 |
| Ethane | 15.0 |
| Propane | 17.5 |
| Iso-butane | 2.3 |
| N-butane | 7.0 |
| Iso-pentane | 2.0 |
| N-pentane | 1.7 |
| Hexanes and higher | 1.5 |
| Total | 100.0 |

If the plant is to be operated for recovery of 70 per cent of the propane, 98 per cent of the butanes and 100 per cent of the iso-pentane and higher hydrocarbons from the raw gas, to produce a commercial grade of propane, butanes, and 16-pound vapor pressure natural gasoline, while processing 4 million cubic feet daily, according to the process embodied in Fig. 3, the equivalent of the following conditions should be maintained for best results:

*Operating conditions of absorber 50 and de-ethanizer 51*

| | |
|---|---|
| Pressure of absorber 50_____p. s. i. g__ | 190 |
| Lean oil introduced through line 52__gals./min__ | 110 |
| Lean oil by-passed through valve 20__gals./min__ | 80 |
| Temperature of rich oil to intercooler 54___° F__ | 117 |
| Rich oil leaves intercooler at_____° F__ | 90 |
| Temperature of rich oil at 55_____° F__ | 113 |
| Temperature of rich oil from heater 56_____° F__ | 272 |
| Temperature of reboiler 61_____° F__ | 363 |
| Pressure on vessel 51_____p. s. i. g__ | 175 |
| Lean oil introduced to vessel 51 through conduit 59 _____gals./min__ | 9 |

*Operating conditions of stripper 19*

| | |
|---|---|
| Pressure _____p. s. i. g__ | 105 |
| Charge temperature of material from heater 17 ° F__ | 465 |
| Steam to stripper through line 28_____lbs./hr__ | 2400 |
| Temperature at top of stripper 19_____° F__ | 190 |
| Temperature at bottom of stripper 19_____° F__ | 455 |
| Pressure on condensate from stripper, conduit 24 _____p. s. i. g__ | 95 |
| Temperature of condensate from stripper, conduit 24 _____° F__ | 80 |
| Reflux ratio at stripper head_____ | 9.5/1 |

*Operating conditions of depropanizer 32*

| | |
|---|---|
| Pressure _____p. s. i. g__ | 190 |
| Charge temperature of material from heater 30 ° F__ | 130 |
| Temperature at top of depropanizer_____° F__ | 120 |
| Temperature of reboiler 33_____° F__ | 217 |
| Pressure on C₃ condensate, line 36_____p. s. i. g__ | 176 |
| Temperature of C₃ condensate, line 36_____° F__ | 80 |
| Reflux ratio to head of depropanizing fractionator_ | 2.5/1 |

*Operating conditions of debutanizer fractionator 38*

| | |
|---|---|
| Pressure _____p. s. i. g__ | 70 |
| Inlet feed temperature_____° F__ | 145 |
| Temperature at top of fractionator 38_____° F__ | 120 |
| Temperature of reboiler section 39_____° F__ | 218 |
| Pressure of C₄ condensate, line 41_____p. s. i. g__ | 55 |
| Temperature of C₄ condensate_____° F__ | 80 |
| Reflux ratio of condensate to head of fractionator 38 _____ | 3.3/1 |

*Temperature of absorption oil*

| | |
|---|---|
| From bottom of stripper 19_____° F__ | 455 |
| Leaving reboiler 61_____° F__ | 425 |
| Leaving heater vessel 33_____° F__ | 390 |
| Leaving heater vessel 39_____° F__ | 410 |
| Combined stream from vessels 33 and 39 to heater 56, i. e., stream in line 46_____° F__ | 400 |
| Leaving heater vessel 56_____° F__ | 265 |
| Leaving pump 23_____° F__ | 265 |
| Delivered to absorber 50 through line 52____° F__ | 90 |

EXAMPLE II

When the plant is operated for the recovery of 80 per cent of butanes and 100 per cent of iso-pentane and higher hydrocarbons from the raw gas, and for production of commercial grade butane and 26-pound vapor pressure natural gasoline while processing 50 million cubic feet daily according to the process embodied in Fig. 3, the equivalent of the following conditions should be observed for best results:

*Composition of gas*

| Component: | Mol per cent |
|---|---|
| Nitrogen | 1.0 |
| Carbon dioxide | 3.0 |
| Methane | 80.5 |
| Ethane | 5.0 |
| Propane | 3.5 |
| Iso-butane | 1.5 |
| N-butane | 2.0 |
| Iso-pentane | 1.0 |
| N-pentane | 1.5 |
| Hexanes and higher | 1.0 |
| Total | 100.0 |

*Operating conditions of absorber 50 and de-ethanizer 51*

| | |
|---|---|
| Pressure of absorber 50_____p. s. i. g__ | 1000 |
| Lean oil introduced through line 52___gals./min__ | 140 |
| Lean oil by-passed through valve 20__gals./min__ | 150 |
| Temperature of rich oil to intercooler 54___° F__ | 110 |
| Rich oil leaves intercooler 54 at_____° F__ | 90 |
| Temperature of rich oil leaving absorber 50 at 55 _____° F__ | 105 |
| Temperature of rich oil from heater 56_____° F__ | 350 |
| Temperature of reboiler 61_____° F__ | 430 |
| Pressure of de-ethanizer 51_____p. s. i. g__ | 400 |
| Lean oil introduced to de-ethanizer 51 through line 59_____gals./min__ | 15 |

*Operating conditions of stripper 19*

| | |
|---|---|
| Pressure _____p. s. i. g__ | 70 |
| Charge temperature of material from heater 17 ° F__ | 435 |
| Steam to stripper through line 28_____lbs./hr__ | 3500 |
| Temperature at top of stripper 19_____° F__ | 165 |
| Temperature at bottom of stripper 19_____° F__ | 430 |
| Pressure on condensate from stripper, conduit 24 _____p. s. i. g__ | 60 |
| Temperature of condensate from stripper, conduit 24 _____° F__ | 80 |
| Reflux ratio at stripper head_____ | 10/1 |

Depropanizer 32 is by-passed in this operation through line 43.

Operating conditions of debutanizer fractionator 38

| | |
|---|---|
| Pressure _____ p. s. i. g__ | 70 |
| Inlet feed temperature, line 43_____° F__ | 145 |
| Temperature at top of fractionator 38_____° F__ | 120 |
| Temperature of reboiler section 39_____° F__ | 198 |
| Pressure of C$_4$ condensate, line 41_____ p. s. i. g__ | 55 |
| Temperature of C$_4$ condensate_____° F__ | 80 |
| Reflux ratio of condensate to head of fractionator 38 _____ | 3.3/1 |

Temperatures of absorption oil

| | |
|---|---|
| From bottom of stripper 19_____° F__ | 430 |
| Leaving reboiler 61_____° F__ | 390 |
| Leaving reboiler 39_____° F__ | 370 |
| Leaving heater 56_____° F__ | 220 |
| Leaving pump 23_____° F__ | 220 |
| Delivered to absorber 50 through line 52___° F__ | 90 |

EXAMPLE III

When the plant is operated for the recovery of 45 per cent of propane, 75 per cent of butanes, 95 per cent of iso-pentane and higher hydrocarbons from the raw gas, and for production of commercial grade propane, butane, and 12-pound vapor pressure motor fuel gasoline, while processing 25 million cubic feet daily, according to process embodied in Fig. 2, the equivalent of the following conditions should be observed for best results:

Composition of gas

| Component: | Mol per cent |
|---|---|
| Methane | 72.0 |
| Ethane | 3.5 |
| Propane | 5.3 |
| Iso-butane | 3.7 |
| N-butane | 8.4 |
| Iso-pentane | 2.6 |
| N-pentane | 2.0 |
| Hexanes and higher | 2.5 |
| Total | 100.0 |

Operating conditions of absorber de-ethanizer 2

| | |
|---|---|
| Pressure of absorber de-ethanizer 2____p. s. i. g__ | 350 |
| Lean oil introduced through line 4___gals./min__ | 200 |
| Lean oil by-passed through valve 20__gals./min__ | 190 |
| Temperature of rich oil to intercooler 6____° F__ | 108 |
| Rich oil leaves intercooler 6 at_____° F__ | 90 |
| Temperature of rich oil to interheater 9____° F__ | 150 |
| Rich oil leaves interheater 9 at_____° F__ | 330 |
| Temperature of reboiler 12_____° F__ | 440 |

Operating conditions of stripper 19

| | |
|---|---|
| Pressure _____p. s. i. g__ | 100 |
| Charge temperature of material from furnace 17 ° F__ | 475 |
| Steam to stripper through conduit 28____lbs./hr__ | 4700 |
| Temperature at top of stripper 19_____° F__ | 220 |
| Temperature at bottom of stripper 19_____° F__ | 460 |
| Pressure on condensate from stripper, line 24 p. s. i. g__ | 90 |
| Temperature of condensate from stripper, line 24 ° F__ | 80 |
| Reflux ratio at stripper head_____ | 12/1 |

Operating conditions of depropanizer 32

| | |
|---|---|
| Pressure _____p. s. i. g__ | 190 |
| Charge temperature of material from heater 30 ° F__ | 130 |
| Temperature at top of depropanizer 32____° F__ | 120 |
| Temperature of reboiler 33_____° F__ | 250 |
| Pressure on C$_3$ condensate, line 36_____p. s. i. g__ | 175 |
| Reflux ratio to head of depropanizer fractionator 32 _____ | 2.8/1 |
| Temperature of C$_3$ condensate, line 36____° F__ | 80 |

Operating conditions of debutanizer fractionator 38

| | |
|---|---|
| Pressure _____p. s. i. g__ | 70 |
| Inlet feed temperature_____° F__ | 170 |
| Temperature at top of fractionator 38_____° F__ | 120 |
| Temperature of reboiler section 39_____° F__ | 255 |
| Pressure on C$_4$ condensate, line 41___p. s. i. g__ | 55 |
| Temperature of C$_4$ condensate_____° F__ | 80 |
| Reflux ratio of condensate to head of fractionator 38 _____ | 4.5/1 |

Temperature of absorption oil

| | ° F. |
|---|---|
| From bottom of stripper 19_____ | 460 |
| Leaving reboiler 12_____ | 390 |
| Leaving reboiler 33_____ | 370 |
| Leaving reboiler 39_____ | 365 |
| Combined stream from reboilers 33 and 39 to heater 9 _____ | 368 |
| Leaving heater 9_____ | 220 |
| Leaving pump 23_____ | 220 |
| Delivered to absorber 2 through line 4_____ | 90 |

The foregoing examples are representative of commercial operations for processing natural gas under conditions of maximum design capacities. Operation of the plants at natural gas capacities below design requires only reducing the rate of lean oil to the absorber directly in proportion to the reduced volume of natural gas being processed and thereby increasing the rate of lean oil to dilution of the enriched oil by a like amount where it is desired to obtain similar recoveries of the various hydrocarbon fractions.

In the event it is desired to operate the plants at an increased absorber pressure and still obtain similar recoveries of the hydrocarbons, then the rate of lean oil to the absorber would be reduced in proportion to the pressure increase, thus increasing the rate of lean oil dilution of the enriched oil by a like amount.

When a given plant is operated with reduced, or increased, absorber temperatures and similar recoveries of hydrocarbons are desired, then the rate of lean oil to the absorber is increased, or decreased as the case may be, directly in proportion to the change in vapor pressure of the lightest hydrocarbon to be recovered at the new operating temperature, the rate of lean oil dilution of enriched oil being accordingly changed thereby.

When a given plant, according to my process, is operated for delivery of residue gas which must have a constant heat of combustion or relatively constant composition, then this can be accomplished by a calorimeter or specific gravity control to regulate the proportionate rates of absorber and dilution oil streams.

When no market is available for propane or the lightest hydrocarbon being recovered, or when it is desirable to increase the heat of combustion of the residue gas, this may be accomplished by reducing the rate of lean oil to the absorber by an amount sufficient to lower or eliminate the absorption of the propane from the raw natural gas. Accordingly, it may be desirable to increase the rate of lean oil dilution of the enriched oil; and in some instances, such change need not be made.

For a better understanding of the flexibility of operation afforded by my improved process, consider the following correlation between operating conditions of Examples I and II. The operation according to Example II for which the primary conditions are:

Daily gas feed_____ 50 million cubic feet, $V_1$.
Absorber pressure_____ 1000 p. s. i. g. $p_1$.
Propane recovery_____ 0%.
Lean oil to absorbers_____ 155 gal./min., $A_1$.

may be changed over to an operation according to Example I, for which the primary conditions are:

Daily gas feed_____ 4 million cubic feet, $V_2$.
Absorber pressure_____ 190 p. s. i. g. $p_2$.
Propane recovery_____ 70%.
Lean oil to absorbers_____ 119 gal./min., $A_2$.

On the basis of the factors of pressure, volume of raw gas processed, species of hydrocarbons to be recovered, etc., the changeover is summed up in terms of the absorber oil feed rate according to the following equation:

$$A_2 = A_1 \left(\frac{V_2}{V_1}\right)\left(\frac{p_1}{p_2}\right)(\Delta C_3 \text{ factor})$$

wherein the various factor symbols are identified in the foregoing tabulations of conditions. The $\Delta C_3$ factor, however, is experimentally arrived at dependent upon the differences in propane recoveries desired in a given plant, as well as differences in the raw gas composition; the value of this factor here is approximately 1.85. Substituting values in the foregoing equation, the new absorber oil rate is shown as follows:

$$A_2 = 155\left(\frac{4}{50}\right)\left(\frac{1000}{190}\right) 1.85 = 120 \text{ gal. oil/min.}$$

Hence for the conditions of Example I, the absorber lean oil rate is about 120 gal./min. as compared with 155 gal./min. required in Example II. It will be noted that the proportion of lean oil used in dilution of the enriched oil prior to stripping, according to Example I, is considerably less than that of Example II for the reason that it represents the optimum rate required for satisfactory performance in the heating furnace (17 of the drawings) and subsequent process heating requirements of the reduced hydrocarbon recovery of Example I.

Other modes of applying the principle of the invention may be employed, change being made as regards the details described, provided the features stated in any of the following claims, or the equivalent of such, be employed.

I, therefore particularly point out and distinctly claim as my invention:

1. In the process of fractionating natural gas which contains a mixture of different molecular weight hydrocarbons wherein the raw material gas to be fractionated is scrubbed with a lean absorber oil which will absorb from the raw gas stream the major proportion of the heavier hydrocarbons to obtain a rich absorber oil, the rich absorber oil is heated under pressure of at least 70 p. s. i. g. and the absorbed components stripped therefrom, and then recycled in the process as said lean absorber oil, the improvement which consists in thus recycling in the system an amount of stripper column bottoms absorber oil substantially equal in volume to the volume of said lean absorber oil plus an excess which on a volume basis is about one to eight times the amount of the absorbed constituents contained in said rich absorber oil and blending the stream of said excess with all of the stream of oil which has been enriched by the scrubbing operation before such enriched oil is heated to strip therefrom its absorbed components.

2. In the process of fractionating natural gas which contains a mixture of different molecular weight hydrocarbons wherein the raw natural gas to be fractionated is scrubbed with a lean absorber oil which will absorb from the raw gas stream the major proportion of the heavier hydrocarbons to obtain a rich absorber oil, the rich absorber oil is heated under pressure of at least about 70 p. s. i. g. and the absorbed components stripped therefrom, the recovered components fractionated and the resultant lean oil circulated in out of-contact heat exchange relation with the rich absorber oil stream and said recovered components during fractionation of the latter and then recycled in the process as said lean absorber oil, the improvement which consists in thus recycling in the system an amount of stripper column bottoms absorber oil substantially equal in volumn to the volume of said lean absorber oil plus an excess which on a volume basis is about one to eight times the amount of the absorbed constituents contained in said rich absorber oil and blending the stream of excess with all of the stream of oil which has been enriched by the scrubbing operation before such enriched oil is heated to strip therefrom its absorbed components.

3. In the process of fractionating natural gas which, in addition to methane and ethane, contains a mixture of different molecular weight hydrocarbons wherein the raw natural gas to be fractionated is scrubbed with a lean absorber oil which will absorb from the raw gas stream the major proportion of the hydrocarbons to obtain a rich absorber oil heavier than methane, the rich absorber oil is heated under pressure of from about 70 p. s. i. g. to 1,000 p. s. i. g. and the absorbed components stripped therefrom, the recovered components fractionated and the resultant heated lean oil circulated in out-of-contact heat exchange relation with the rich absorber oil stream and said recovered components during fractionation of the latter and then recycled in the process as said lean absorber oil, the improvement which consists in thus recycling in the system an amount of stripper column bottoms absorber oil substantially equal in volume to the volume of said lean absorber oil plus an excess which on a volume basis is about one to eight times the amount of the absorbed constituents contained in said rich absorber oil and blending the stream of said excess with all of the stream of oil which has been enriched by the scrubbing operation before such enriched oil is heated to strip therefrom its absorbed components.

4. The process of fractionating natural gas which contains a mixture of different molecular weight hydrocarbons which comprises scrubbing the raw natural gas with a lean absorber oil which will absorb from the raw gas stream the major proportion of the heavier hydrocarbons to obtain a rich absorber oil, heating the rich absorber oil under pressure of at least about 70 p. s. i. g. and the absorbed components stripped therefrom, fractionating the recovered components, circulating the resultant heated lean oil in out-of-contact heat exchange relation with the rich absorber oil stream and said recovered components during fractionation of the latter, said process characterized further that an amount of stripper column bottoms absorber oil substantially equal in volume to the volume of said lean absorber oil plus an excess which on a volume basis is about one to eight times the amount of the absorbed constituents contained in said rich absorber oil is blended with all of the stream of oil which has been enriched by the scrubbing operation before such enriched oil is heated to strip therefrom its absorbed components.

5. An improved process for recovering hydrocarbon components from natural gas by means of absorption which comprises the steps of scrubbing the raw natural gas with an absorber oil to become enriched with and substantially saturated by hydrocarbons at least heavier than $C_2$, diluting all of the enriched absorber oil with an amount of lean stripper column bottoms absorber oil which on a volume basis is about one to eight times the amount of the absorbed constituents contained in said rich absorber oil heating the combined absorber oil streams under pressure of about 70 p. s. i. g. to 1,000 p. s. i. g. and stripping therefrom the hydrocarbons absorbed therein, fractionating the thus separated natural gas hydrocarbons into gaseous and liquid fractions, passing the stripped hot absorber oil in the process in heat exchange relation with the absorption and fractionating steps of the process, and recycling the lean absorber oil in absorption and dilution steps.

References Cited in the file of this patent

UNITED STATES PATENTS

| | | |
|---|---|---|
| 1,851,743 | Wadsworth | Mar. 29, 1932 |
| 2,367,284 | Kaplan | Jan. 16, 1945 |
| 2,367,285 | Brandt | Jan. 16, 1945 |